United States Patent

[11] 3,547,326

| [72] | Inventor | Earl M. Trammell, Jr.<br>Ladue, Mo. (c/o EMT Enterprises, Box 453, St. Louis, MO 63166) |
|---|---|---|
| [21] | Appl. No. | 724,509 |
| [22] | Filed | April 26, 1968 |
| [45] | Patented | Dec. 15, 1970 |

[54] LITTER DISPOSAL UNIT IN AN AUTOMOBILE SEAT ASSEMBLY
11 Claims, 14 Drawing Figs.

[52] U.S. Cl. ..................................................... 224/42.42, 224/29
[51] Int. Cl. ..................................................... B60r 9/04
[50] Field of Search ........................................... 224/42.11, 42.42, 42.42A, 42.45B, 29.4, 29; 206/19.5A

[56] References Cited
UNITED STATES PATENTS

| 2,735,597 | 2/1956 | Treleven | 224/42.42X |
| 2,797,033 | 6/1957 | Rasbach | 224/29.4 |
| 3,291,353 | 12/1966 | Sobczak | 224/42.42(A) |
| 2,633,180 | 3/1953 | Reed | 224/42.42AX |
| 2,962,198 | 11/1960 | Bell | 224/29.4 |

*Primary Examiner*—Gerald M. Forlenza
*Attorney*—Cohn and Powell

ABSTRACT: A utility device, such as a litter container or the like, is held against either the front or rear sides of an automobile front seat that is selectively adjustable in position forwardly or rearwardly. A spring is located on and about one arm of a substantially L-shaped rod, the other rod arm engaging the container. The spring is connected to the rod and to an anchorage either on the automobile floor or to the seat, whereby the spring exerts a pull on the rod and urges the container against the seat side in all adjusted positions of the seat.

PATENTED DEC 15 1970

INVENTOR
EARL M. TRAMMELL, JR.
BY
Cohn and Powell
ATTORNEYS

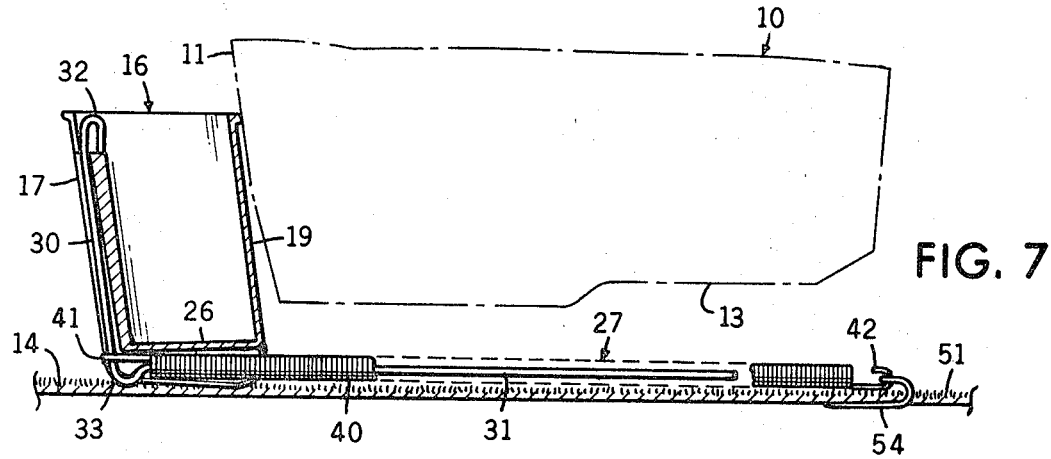
FIG. 7
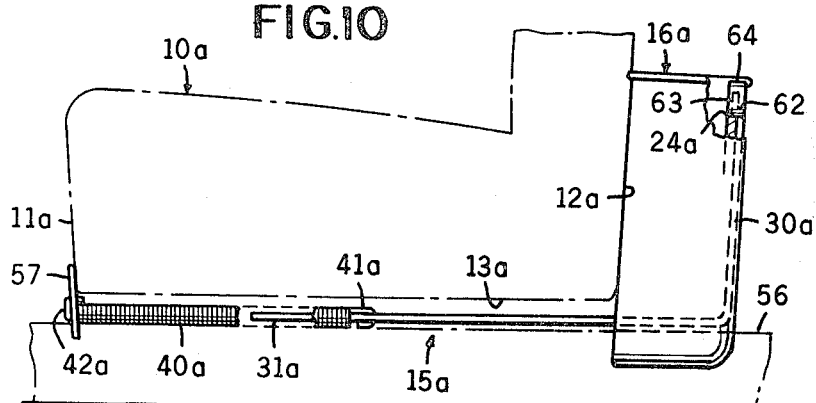
FIG. 10
FIG. 8
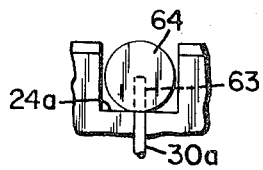
FIG. 13
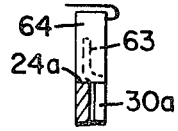
FIG. 14
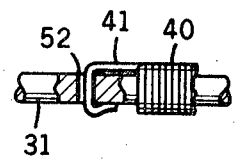
FIG. 9
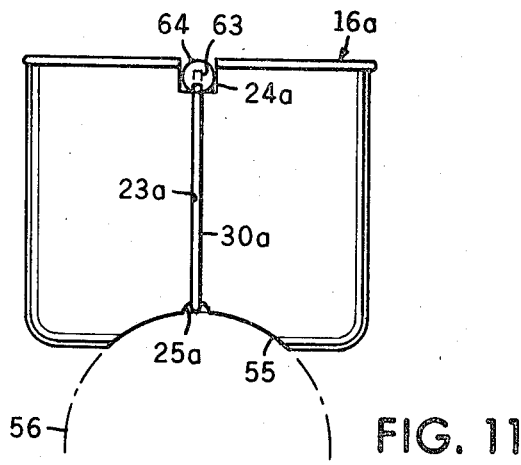
FIG. 11
FIG. 12
INVENTOR
EARL M. TRAMMELL, JR.
BY
Cohn and Powell
ATTORNEYS 3,547,326

LITTER DISPOSAL UNIT IN AN AUTOMOBILE SEAT ASSEMBLY

BACKGROUND OF THE INVENTION

This invention relates generally to improvements in a litter disposal unit in an automobile seat assembly, and more particularly, to an improved means for mounting such container to a forwardly or rearwardly adjustable front seat. The container can hold litter, driving accessories or any convenience items.

The heretofore conventional litter containers have either incorporated a gravity fit such as the common placement of the container across the transmission hump on the front seat floor, or have employed attaching means for the litter container to the dashboard, kickpad, etc. of the automobile. These latter means of attachment necessitated different fixtures for each make of automobile. Also both gravity and fixed positions mentioned serve to interfere at times with the movements of the driver and passenger. Litter containers have also been made in one piece with an integral hook that hooks underneath the front seat of an automobile, to maintain a fixed position against the lower front part of the front seat. This is a desirable location since it is both accessible and out of the way of the occupants. However, there has been no general acceptance to date of this hook design since it is limited in practical attachment to the varying underseat structures.

Those devices that could be hung from internal projections were usually constructed inexpensively of paper so that they could be thrown away when filled, and consequently were not readily available when a supply was depleted. Moreover, such containers were not convenient because they obstructed the use of the mounting projection and were usually located in an area where they interfered with the driver's or passenger's movements and actions.

Those containers that rested on the seat took up seating room and diminished the occupant's comfort.

Those containers that rested on the floor hindered the movement of the occupant's legs and were not always in the optimum position for usage, especially when utilized in conjunction with a movably mounted automobile front seat.

There are no prior containers of this general type that can be installed to the seat assembly as an accessory, at minimal expense and yet achieve the desired functional advantages.

SUMMARY OF THE INVENTION

The present litter container is attached to an automobile seat at either the front or rear sides by a special mounting means. At the front of the seat, the container is located under the occupant's legs near the floor so that the container does not hamper the movement of the occupant. At either the front or rear side of the seat, the container will be in a relatively concealed position, yet will be readily available for usage. The container does not occupy important and otherwise usable seat or floor space. This invention positions the litter container in this convenient position by new attachment means which permit practical and easy installation on a front seat structure of any automobile including those with power seats. It introduces a self-adjusting and pressure fit against the front seat regardless of the structure variance that exists from one make of automobile to another.

The litter disposal unit, including the unique mounting means, is simple and durable in construction, and inexpensive to manufacture and assemble. It can be quickly and easily installed in any automobile by anyone without the need for any complicated instructions or special tools. Accordingly, the unit is one that can be sold as an accessory and can be readily installed by the average automobile owner or user.

Because the litter container is retained to the seat side by the mounting means, the container will be carried by the seat during selective adjustment of the seat position, and will therefore be maintained in the appropriate location at all times.

A resilient spring is provided having one end connected to a mounting means engaging the container, and having the other end connected to an anchorage means. The spring exerts a pull on the attachment means and holds the container to the associated seat side in all adjusted positions of the seat. The anchorage means can comprise a pin or an adhesive strip that fixes the spring end to the seat side opposite to that side against which the container is held, or can comprise a pin that fixes the spring end to the carpet or floor at a point away from the seat side against which the container is held and in a direction toward the opposite side.

Preferably, the mounting means is a substantially L-shaped rod having a first connected to the container and having a second arm extending under the seat. The spring is disposed on and about the second rod arm so that the spring is supported and guided by the rod.

BRIEF DESCRIPTION OF THE DRAWINGS

FIG. 7 is a side elevational view, partly in cross section, of a modified construction of the litter disposal unit;

FIG. 8 is a perspective view of the carpet pin utilized in FIG. 7;

FIG. 9 is an enlarged fragmentary view, partially in cross section, showing the attachment of one spring end to the rod;

FIG. 10 is a side elevational view of still another modified construction of the litter disposal unit in a seat assembly;

FIG. 11 is a rear elevational view of the litter disposal unit disclosed in FIG. 10;

FIG. 12 is an enlarged perspective view of the anchorage utilized in FIG. 10;

FIG. 13 is an enlarged, fragmentary rear view of the handgrip shown in FIG. 10; and FIG. 14 is a fragmentary, side view, partly in cross section of the handgrip shown in FIG. 13.

DESCRIPTION OF THE PREFERRED EMBODIMENTS

Figure 1:
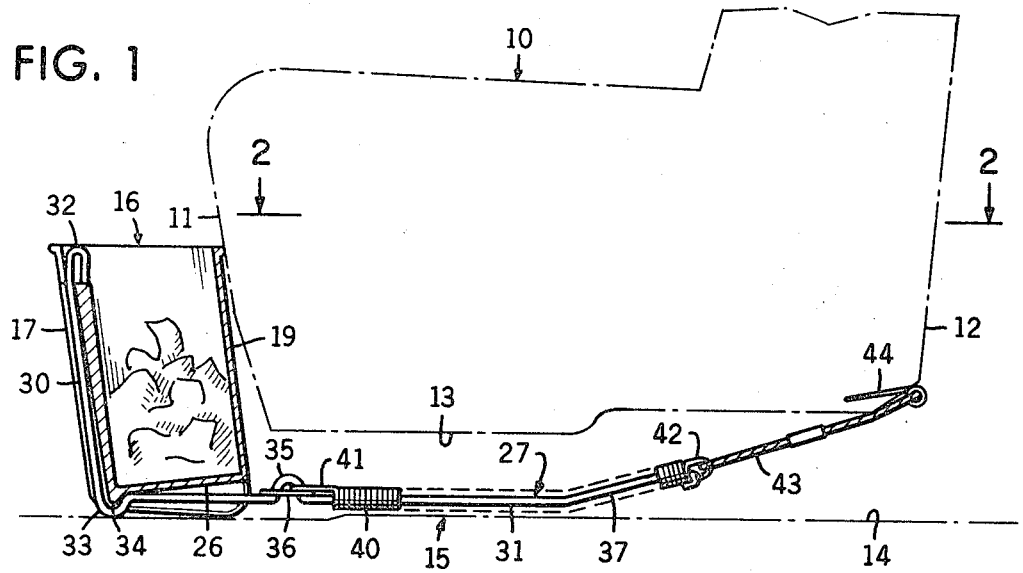
FIG. 1 is a side elevational view, partly in cross section, showing the litter disposal unit in an automobile seat assembly.
Figure 2:
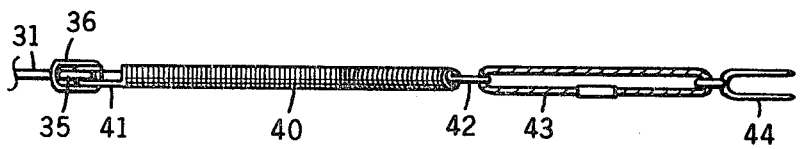
FIG. 2 is a top plan view taken on line 2-2 of FIG. 1.

Referring first to the embodiment disclosed in FIG. 1, it will be understood that the seat assembly includes an automobile front seat 10 having a front side 11 and a rear side 12. As is usual, the bottom 13 of seat 10 is spaced slightly above the floor 14. Although not shown, it will be readily understood that the automobile front seat 10 can be selectively adjusted forwardly or rearwardly by suitable conventional mechanism.

Figure 3:
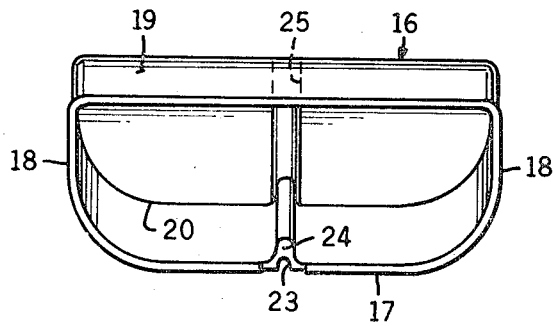
FIG. 3 is a top plan view of the container.
Figure 4:
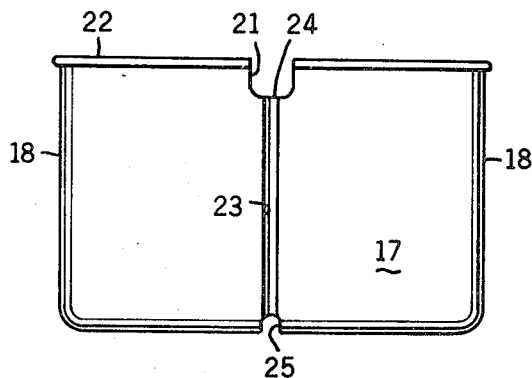
FIG. 4 is a front elevational view of the container.

The litter disposal unit generally indicated by 15 includes a container 16, the structure of which is best shown in FIGS. 1, 3 and 4. The container is preferably constructed of plastic material. The container 16 includes a front wall 17 rounded at the corners and merging with side wall 18 to join with a flat rear wall 19. The container includes a bottom wall 20.

As is best seen in FIG. 4, a top recess 21 is formed in the top margin 22 of container 16 centrally of the front wall 17. Provided in the front wall 17 and extending from the top recess 21 to the bottom wall 20, is a narrow, elongate front recess 23. The top of the front recess 23 is defined by an inset ledge 24, constituting a part of the container top margin 22.

The bottom wall 20 is provided with a bottom recess 25 extending between the front wall 17 and rear wall 19, and communicating with the front recess 23. For reasons which will later appear, the bottom recess 25 is partially defined by an inclined margin 26 (FIG. 1) extending upwardly from the front wall 17 to the rear wall 19.

The mounting means for the container 16 includes a substantially L-shaped rod referred to by 27, having a first rod arm 30 interfitting the front recess 23, and having a second rod arm 31 interfitting the bottom recess 25 and extending rearwardly from the front side 11 toward the rear side 12 along the floor 14. For reasons which will later appear, the second rod arm 31 is provided with an upturned end. The upper end of the rod arm 30 is provided with a hook 32, constituting a handgrip, overlying and engaging the ledge 24 of front wall 17.

At the juncture of the rod arms 30 and 31, the rod arm 31 is provided with a downwardly extending projection 33 that is open at the top. This projection 33 extends slightly below the bottom wall 20 of container 16 and slidably engages the floor 14.

The front wall 17 of container 16 is provided with a depending flange 34 that interfits the top-open projection 33. To assemble the container 16 to the rod 27, the second rod arm 31 is located in the bottom recess 26, and the container flange 34 is disposed in the top-open projection 33. Then, the container 16 is swung forwardly to bring the first rod arm 30 into the front recess 23 and to locate the hook 32 over the ledge 24. The inclined margin 26 of bottom wall 20 permits this pivotal or swinging movement of container 16. When the container 16 is urged against the front side 11 of seat 10 by pressure exerted through the first rod arm 30, the container 16 is secured to and by the rod 27.

The second rod arm 31 is provided with an inwardly extending projection 35 that is open at the bottom, the projection 35 being located adjacent the rear wall 19 of container 16. Located over and retained by the projection 35 is a rectangular clip 36, the clip 36 and projection 35 forming an attachment eye.

The rear end 37 of the second rod arm 31 extends rearwardly and upwardly from the floor 14 toward the rear side 12 of seat 10.

Located on and about the second rod arm 31 is a tension spring 40 constituting a resilient means. One end 41 of spring 40 is hooked into the eye formed by the projection 35 and clip 36. The opposite end 42 is hooked to a wire cable loop 43, the cable loop 43 being flexible and preferably constructed of metal. A pin 44 is attached to the cable loop 43 and is selectively attached to the rear side 12 of seat 10. The cable loop 43 and pin 44 constitute an anchorage means. When so attached, the loading of spring 40 exerts a pull on the rod 27 and urges the container 16 against the front side 11 of seat 10. The reversed or rolled top of the inclined rod end limit the extension of spring 40 and protects the underside of the seat.

The litter disposal unit 15 can be quickly and easily installed in the seat assembly. It will be assumed that the pin 44 is attached to the cable loop 43. First, the spring 40 is slipped over the second rod arm 31, and the spring end 41 is attached in the eye provided by projection 35 and clip 36. The other spring end 42 is hooked to the cable loop 43. The bottom recess 25 of container 16 is located over the second rod arm 31 with the container flange 44 located in the top-open projection 33. The container 16 is tilted forwardly until the first rod arm 30 is located in the front recess 23 and the hook 32 overlies the top ledge 24.

With this assembly, the rear wall 19 of container 16 is located against the front side 11 of seat 10, and the second rod arm 31 is extended along the floor 14 beneath the seat 10 toward the rear seat side 12. The cable loop 43 is pulled to provide a spring loading on the rod 27, and the pin 44 is attached to the bottom portion of the rear seat side 12. The spring 40 pulls the rod 27 and urges the container 16 against the front seat side 11.

Upon changing the position of seat 10 either forwardly or rearwardly, the container 16 will be held firmly against the front seat 11 at all times. To facilitate movement of the container 16 with the seat 10, the rounded projection 33 and the rounded rear bottom corner of the container 16 ride easily on the floor 14.

It will be noted that the location of the container 16 on the floor at the bottom portion of the front seat side 11 is under the occupant's legs, completely out of the way and at least partially concealed. If it is desired to empty the container 16, the occupant merely reaches down to grip the hook 32 and pulls the rod 27 outwardly to release the container 16. The container 16 is simply tilted rearwardly to disengage the hook 32 from the top ledge 34 and is lifted clear of the rod 27.

To replace the container 16, the occupant grips the hook 32 and pulls the rod 27 forwardly to permit the insertion of container 16 between the first rod arm 30 and the front seat side 11. As previously explained, the second rod arm 31 is located in the bottom recess 25 and the container flange 34 is located in the top-open projection 33. Then, the container is tilted forwardly to locate the first rod arm 30 in the front recess 23 and to locate the hook 32 over the top ledge 24. Upon digital release of the hook 32 by the occupant, the loading of spring 40 causes the rod 27 to urge the rear wall 19 against the bottom portion of front seat side 11.

Figure 5:
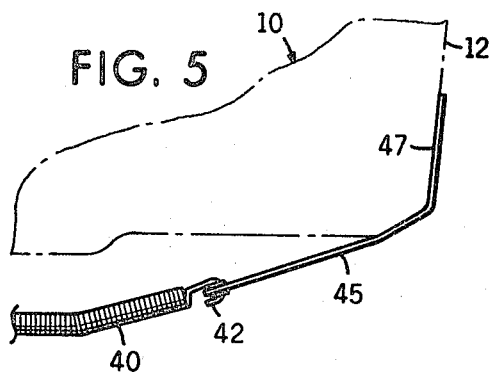
FIG. 5 is a fragmentary elevational view illustrating another attachment of the spring to the automobile seat.
Figure 6:
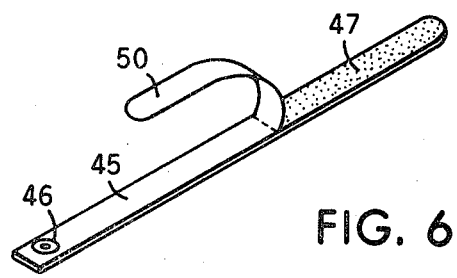
FIG. 6 is a perspective view of the adhesive strip utilized in the attachment of FIG. 5.

A different type of anchorage means is disclosed in FIGS. 5 and 6. In this embodiment, an elongate strip of nylon-impregnated tape 45 is provided with an eyelet 46 at one end and is provided with a pressure-contact adhesive 47 at the opposite end. The adhesive 47 is protected by a cover 50 that can be quickly and easily peeled off, when desired, incident to installation.

When utilized in the litter disposal unit previously described with respect to FIG. 1, the adhesive strip 45 is utilized in lieu of the cable loop 43 and pin 44. Upon installation, the spring end 42 is hooked in the eyelet 46 and the protective cover 50 is removed to expose the adhesive 47. The strip 45 is pulled to extend the spring 40, and the adhesive 47 is placed on the bottom portion of the rear seat side 12 to secure the strip 45. The installation of the litter disposal unit and its usage is otherwise the same as that previously described with respect to the embodiment of FIG. 1.

Upon installing the litter disposal unit of FIG. 1, utilizing the anchorage means disclosed in FIG. 1 or that disclosed in FIG. 5, the installer can make simple adjustments, as by bending the first rod arm 30 at the projection 33, or by bending the inclined rod end 37, in order to assure the appropriate disposition of the container 16 on the floor 14 and against the front seat side 11.

FIG. 7 illustrates a slightly different embodiment of the litter disposal unit when located against the front seat side 11. In view of the close similarity in structure to that previously disclosed and described with respect to FIG. 1, the same reference numerals will be utilized wherever possible for corresponding parts. The description will be directed primarily to the difference in structure.

For example, the second rod arm 31 is substantially straight and extends above a carpet 51 on the floor 14. The spring end 41 is hooked around the first rod arm 30. The other spring end 42 is hooked to the bight 53 of carpet pin 54, constituting the anchorage means, which is secured to the carpet 51.

To install the litter disposal unit of FIG. 7, the container 16 is connected to the rod 27 in the same manner as that previously described with the embodiment of FIG. 1. The spring 40 is slipped over the second rod arm 31 and the spring end 41 is attached to the rod arm 30. Then, the other spring end 42 is pulled to tension the spring 40, and is hooked into the bight 53 of carpet pin 54, the pin 54 being anchored to the carpet 51 in the vicinity of the rear seat side 12.

It will be understood that the container 16 is held against the front seat side 11 under the loading of spring 40 in all forwardly or rearwardly adjusted positions of seat 10. The container 16 is removed and replaced in the same manner as that previously described with respect to the embodiment of FIG. 1.

FIGS. 10—12 illustrate a somewhat similar litter disposal unit 15a. In view of the somewhat different structure, those parts corresponding essentially to those previously described with respect to the embodiment of FIGS. 1 and 7 will be given identical reference numbers with the suffix a.

For example, the container 16a is similar to the container 16 of FIGS. 1 and 7, but is provided with an inwardly concave bottom wall portion 55 adapted to conform to and accommodate the hump provided by the transmission tunnel 56.

The second rod arm extends forwardly toward the front seat side 11a between the bottom 13a of seat 10a and the top of the transmission tunnel 56.

One spring end 41a is attached to the second rod arm 31a in the manner shown by the attachment of spring end 41 in FIG. 9. The other spring end 42a is attached to a retaining plate 57 as is best shown in FIG. 12, the plate 57 constituting the anchorage means. The plate 57 is provided with a curvilinear end 60 that conforms substantially to the hump of the transmission tunnel 56, while the upper plate end 61 engages the front seat side 11a. The plate 57 fixes the spring end 42a to the front seat side 11a, while the rod 27a exerts a pull under the loading of spring 40a on the container 16a, whereby to hold the container 16a against the rear seat side 12a.

As is shown in FIGS. 10 and 11, the upper end of the first rod arm 30a has a slightly different structure from that shown in the embodiments of FIGS. 1 and 7. In this embodiment the first rod arm 30a is provided with an in-turned rod portion 62 that overlies the top ledge 24a, and provides an integral vertical rod portion 63.

A circular disc 64 can be slipped over and press fitted or cemented to the vertical rod portion 63 to provide a handgrip. If desired, this disc 64 can be provided with the automobile emblem or any other suitable design.

The container 16a can be assembled with the mounting rod 27a in the same manner as previously described with the embodiments of FIGS. 1 and 7. The spring 40a is attached to the second rod arm 31a and is attached to the retaining plate 57 which is pulled forwardly to bear against the front seat side 11a. The container 16a will be held against the back side of seat 10a regardless of the forwardly and rearwardly adjustment of seat 10a. If removal of the container 16a is desired, the disc 64 constituting the handgrip is gripped and the rod 27a is pulled rearwardly against the loading of spring 40a, whereby to release the in-turned rod portion 62 from the ledge 24a and to withdraw the first rod arm 30a from its compatible container wall recess 23a. The container 16a can be emptied and then readily replaced.

I claim:

1. A litter disposal unit for attachment to an automobile seat having a seat portion and a back portion, the unit comprising:
   a. a container including a wall;
   b. mounting means engaging the container;
   c. resilient means connected to the mounting means and exerting a pull on the container below the seat portion tending to urge said container wall against one side of the seat, the mounting means being adjustable against the loading of the resilient means to enable removal and replacement of the container;
   d. anchorage means connected to the resilient means and adapted to receive the resilient means to a point in the automobile whereby the resilient means exerts a pull on the container for holding the container to the seat side;
   e. the mounting means including a rod detachably connected to the container; and
   f. the resilient means being a spring having one end connected to the rod.

2. A litter disposal unit for attachment to an automobile seat having a seat portion and a back portion, the unit comprising:
   a. a container including a wall;
   b. mounting means engaging the container;
   c. resilient means connected to the mounting means and exerting a pull on the container below the seat portion tending to urge said container wall against one side of the seat, the mounting means being adjustable against the loading of the seat, the mounting means being adjustable against the loading of the resilient means to enable removal and replacement of the container;
   d. anchorage means connected to the resilient means and adapted to receive the resilient means to a point in the automobile whereby the resilient means exerts a pull on the container for holding the container to the seat side;
   e. the mounting means including a rod connected to the container and extending under the seat toward the opposite side;
   f. the resilient means being a spring having one end connected to the rod; and
   g. the anchorage means including a strap connectable with the spring and adapted for securement to the automobile seat adjacent the opposite side.

3. A litter disposal unit as defined in claim 2, in which the strap includes an adhesive strip selectively adhered to the seat.

4. A litter disposal unit as defined in claim 2, in which the strap includes a cable means attached to the other end of the spring, and a pin attached to the cable means and secured to the vehicle seat.

5. A litter disposal unit for attachment to an automobile seat having a seat portion and a back portion, the unit comprising:
   a. a container including a wall;
   b. mounting means engaging the container;
   c. resilient means connected to the mounting means and exerting a pull on the container below the seat portion tending to urge said container wall against one side of the seat, the mounting means being adjustable against the loading of the resilient means to enable removal and replacement of the container;
   d. anchorage means connected to the resilient means and adaptable to receive the resilient means to a point in the automobile whereby the resilient means exerts a pull on the container for holding the container to the seat side;
   e. the mounting means including a substantially L-shaped rod having a first arm connected to the container and having a second arm extending under the seat toward the opposite side;
   f. the resilient means being a spring located about and on the second rod arm, and connected to the rod; and
   g. the mounting means including an anchorage means connected to the spring and adapted for securement to the automobile adjacent the opposite side of the seat.

6. A litter disposal unit as defined in claim 5, in which:
   h. the first rod arm is provided with an in-turned portion fitting over a ledge of the container;
   i. the second arm is provided with a downwardly extending projection, the projection being open at the top; and
   j. the container includes a flange interfitting the top-open projection, whereby to hook the projection and hold the container in position against the seat.

7. A litter disposal unit as defined in claim 6, in which the rod projection is rounded and engages the floor below the seat.

8. In a seat assembly for an automobile:
   a. a seat having opposite front and rear sides;
   b. means mounting the seat for selective adjustment forwardly or rearwardly in the automobile;
   c. a container mounted behind the occupant's legs;
   d. mounting means engaging the container;
   e. a resilient means connected to the mounting means and exerting a pull on the container below the seat portion tending to urge the container against one side of the seat, the mounting means being adjustable against the loading of the resilient means to enable removal and replacement of the container;
   f. anchorage means connected to the resilient means and adapted to secure the resilient means to a point in the automobile whereby the resilient means exerts a pull on the container for holding the container to the said one seat side in all adjusted positions of the seat;
   g. the mounting means including attachment means detachably connected to the container;
   h. the resilient means being a spring having one end connected to the attachment means, and extending under the seat toward the opposite seat side;
   i. the attachment means including a substantially L-shaped rod having a first arm connected to the container and having a second arm extending under the seat toward the opposite seat side; and j. the spring being located about and on the second rod arm, and connected to the second rod arm and to the anchorage means.

9. A seat assembly as defined in claim 8, in which:
k. the container includes a bottom wall seating on the second rod arm, and a front wall clamped between the first rod arm and said one seat side;
l. the container has a flange depending below the bottom; and
m. the second rod arm includes a downwardly extending projection engaging the carpet below the seat upon seat adjustment, the projection having a top-open recess receiving the container flange.

10. A seat assembly as defined in claim 8, in which:
k. the container includes a front wall, a rear wall, and a bottom wall provided with a recess extending between the front and rear walls, the front wall being provided with a front recess extending from the bottom recess to the top margin of the front wall; and
l. the first rod arm interfits the front recess and engages the front wall, the first rod arm including an inturned portion overlying a ledge of the container at the top of the front recess, the second rod arm interfitting the bottom recess and engaging the bottom wall.

11. A seat assembly as defined in claim 8, in which the second rod arm includes an upwardly inclined rod end over which the spring fits, the rod end being selectively bendable to a greater or lesser angle so that the spring tends to tilt the second rod arm down or up respectively in order to exert a substantially horizontal pull.